United States Patent
Wyciechowski et al.

(10) Patent No.: US 12,466,374 B2
(45) Date of Patent: Nov. 11, 2025

(54) BRAKE-TO-STEER FOR STEER-BY-WIRE CONTROL ALGORITHM USING SUPPORT FROM TERTIARY STEERING ACTUATION

(71) Applicants: Steering Solutions IP Holding Corporation, Auburn Hills, MI (US); Continental Automotive Systems, Inc., Auburn Hills, MI (US)

(72) Inventors: Michael S. Wyciechowski, Grand Blanc, MI (US); Scott T. Sanford, Swartz Creek, MI (US)

(73) Assignees: Steering Solutions IP Holding Corporation, Auburn Hills, MI (US); Continental Automotive Systems Inc., Auburn Hills, MI (US)

( * ) Notice: Subject to any disclaimer, the term of this patent is extended or adjusted under 35 U.S.C. 154(b) by 112 days.

(21) Appl. No.: 18/363,982

(22) Filed: Aug. 2, 2023

(65) Prior Publication Data

US 2024/0092326 A1    Mar. 21, 2024

Related U.S. Application Data

(60) Provisional application No. 63/408,492, filed on Sep. 21, 2022.

(51) Int. Cl.
- *B60T 8/92* (2006.01)
- *B60T 8/52* (2006.01)
- *B62D 9/00* (2006.01)
- *B62D 11/08* (2006.01)

(52) U.S. Cl.
CPC .................. *B60T 8/92* (2013.01); *B60T 8/52* (2013.01); *B62D 9/005* (2013.01); *B62D 11/08* (2013.01); *B60T 2260/02* (2013.01)

(58) Field of Classification Search
CPC .......... B60T 8/92; B60T 8/52; B60T 2260/02; B60T 2260/022; B60T 2260/024; B62D 11/08; B62D 9/005; B62D 9/007
See application file for complete search history.

(56) References Cited

U.S. PATENT DOCUMENTS

| | | | |
|---|---|---|---|
| 10,046,743 B2 | 8/2018 | Jonasson et al. | |
| 10,046,749 B2 | 8/2018 | Jonasson et al. | |
| 2016/0325721 A1* | 11/2016 | Jonasson | B60T 8/171 |
| 2022/0111895 A1 | 4/2022 | Schumann et al. | |
| 2023/0058353 A1 | 2/2023 | LaBarbera et al. | |
| 2023/0119160 A1 | 4/2023 | LaBarbera et al. | |
| 2023/0119249 A1 | 4/2023 | LaBarbera et al. | |

(Continued)

OTHER PUBLICATIONS

Alexander Jennings et al.; Brake-To-Steer Lateral Stability Management Based On Stability Indicator Correlation; Filed on Aug. 3, 2023 and assigned U.S. Appl. No. 18/365,042.

(Continued)

*Primary Examiner* — Jacob M Amick
(74) *Attorney, Agent, or Firm* — Ingrassia Fisher & Lorenz, LLP

(57) ABSTRACT

A number of variations may include a system, method, a non-transitory computer readable medium having instructions thereon executable by an electronic processor to implement functionality comprising enhancing the curvature capability of a tertiary rack and pinion actuator by using brake-to-steer while the tertiary rack and pinion actuator is operating.

20 Claims, 2 Drawing Sheets

(56) References Cited

U.S. PATENT DOCUMENTS

2023/0121296 A1 4/2023 LaBarbera et al.
2023/0124821 A1 4/2023 LaBarbera et al.

OTHER PUBLICATIONS

Alexander Jennings et al.; Brake-To-Steer Lateral Stability Management Based On Stability Indicator Correlation ; Filed on Aug. 3, 2023 and assigned U.S. Appl. No. 18/365,057.
Alexander Jennings et al.; Brake-To-Steer Lateral Stability Management Based On Stability Indicator Correlation ; Filed on Aug. 3, 2023 and assigned U.S. Appl. No. 18/365,064.
Alexander Jennings et al.; Brake-To-Steer Lateral Stability Management Based On Stability Indicator Correlation ; Filed on Aug. 3, 2023 and assigned U.S. Appl. No. 18/365,073.

* cited by examiner

BRAKE-TO-STEER FOR STEER-BY-WIRE CONTROL ALGORITHM USING SUPPORT FROM TERTIARY STEERING ACTUATION

This application claims the benefit of U.S. Provisional Application No. 63/408,492 filed Sep. 21, 2022.

TECHNICAL FIELD

The field to which the disclosure generally relates to includes steering, braking, and propulsion systems.

BACKGROUND

Vehicles may include steering systems including electronic power steering systems incorporating steer-by-wire technology or brake-to-steer technology.

SUMMARY OF ILLUSTRATIVE VARIATIONS

A number of variations may include a system, method, a non-transitory computer readable medium having instructions thereon executable by an electronic processor to implement functionality comprising enhancing the curvature capability of a tertiary rack and pinion actuator by using brake-to-steer while the tertiary rack and pinion actuator is operating.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
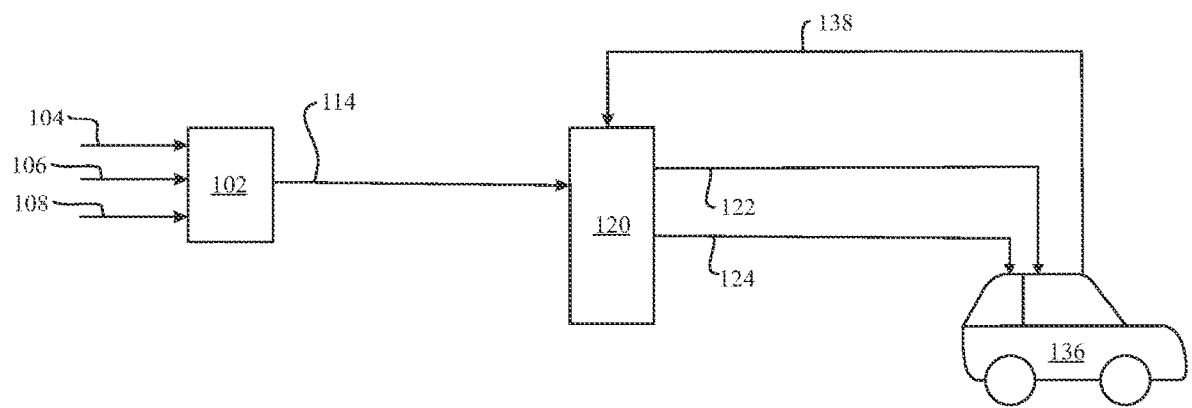
FIG. 1 depicts an illustrative variation of a simplified diagram including a system and method using brake-to-steer to support a steer-by-wire system.

The following description of the variations is merely illustrative in nature and is in no way intended to limit the scope of the invention, its application, or uses.

A number of variations include the identification of constraints upon suspension design for maximizing the curvature capability (i.e., maneuvering capability) that can be generated by the brake system as a redundant method to steer a disabled steer-by-wire system, for example, to a safe state. Requirements for a tertiary level of steering rack (or road wheel) actuation are being evaluated. However, there are costs involved with such a design. It can be assumed there will be attempts to make this tertiary actuator as small as possible to manage the cost.

A number of variations avoid or at least help minimize these suspension design limitations and enable the selection of lower output tertiary rack actuators. In a number of variations, the steer-by-wire primary actuator may have a first output magnitude and the tertiary rack actuator may have a second output magnitude. In a number of variations, the maximum second output magnitude may be equal to or less than one half of the first magnitude, the maximum second output magnitude may be equal to or less than one third of the first magnitude, or the maximum second output magnitude may be equal to or less than one quarter of the first magnitude. By implementing a combined brake request and tertiary steering control actuator, the effectiveness of brake-to-steer can be enhanced. This may be an advantage for vehicle manufacturers who demand brake-to-steer provide greater maneuverability to reach a safe vehicle state upon the event of a loss of the secondary steering redundancy.

A number of variations may include a brake-to-steer control algorithm using steering wheel angle, vehicle speed, yaw rate, lateral acceleration, and steer-by-wire system operational status to generate a set of brake system requests that will assist the tertiary steering actuator to target lateral performance of a vehicle with that of a fully functioning steer-by-wire system. The tertiary steering actuator may consist of several possible solutions (e.g., hydraulic force from an ABS pump, an independent tertiary steering controller/motor).

A number of variations may provide the vehicle manufacturer the freedom to retain preferred suspension design for a vehicle. Provides the steering supplier the opportunity to reduce costs by downsizing the tertiary actuator. Enhances the safety coverage for feasible emergency safety maneuvers to allow the driver to navigate the vehicle, which may be to a safe location upon loss of primary and secondary steering actuator control.

A number of variations may include a system, method and/or a non-transitory computer readable medium having instructions thereon executable by an electronic processor to implement functionality and address the following. The steer-by-wire primary and secondary actuators may experience failures that cause them to shut down. The vehicle is now being controlled by a small tertiary steering rack actuator. During certain scenarios that require high power output from the steering rack, it is understood that the tertiary actuator may fall short of the required performance. The brake-to-steer controller may communicate the status of the steer-by-wire system, wherein the steer-by-wire system has limited performance. Using understanding of vehicle and steer-by-wire system dynamics, the brake-to-steer controller calculates a target yaw rate based on the drivers input. In a number of variations, the target yaw rate may be calculated using steering wheel angle and vehicle speed, with some assumptions for steer-by-wire system dynamics. When it is determined the vehicle cannot or is not close enough to the target yaw rate the brake-to-steer controller calculates a differential braking torque to assist the steer-by-wire system to increase the vehicle's lateral response.

A number of variations may include a non-transitory computer readable medium having software control algorithm instructions thereon executable by an electronic processor to implement one or more functionalities described herein on a control module independent of the steer-by-wire control hardware where a tertiary steering actuation system is present on the vehicle. In a number of variations, the non-transitory computer readable medium having software control algorithm instructions thereon executable by an electronic processor to implement one or more functionalities described herein may be integrated into a complete steer-by-wire system solution, which may include a steering tertiary controller.

Existing brake-to-steer concepts are limited to the redundant lateral control of the vehicle as produced from the brake system alone. A number of variations may provide an enhanced brake-to-steer control algorithm that harmonizes the braking and tertiary steering commands to achieve an enhanced vehicle yaw response than cannot be achieved by control via either a brake system or a tertiary actuator alone.

In a number of variations, the brake-to-steer tertiary support may function based upon studying and understanding the response of a vehicle (typically measured in yaw rate} with a fully functioning steer by wire system. This is then used to calculate a reference yaw rate based upon driver input. In the event of a tertiary rack actuator of the steer by wire system is not powerful enough to replicate the yaw rate of a fully functioning steer by wire system, the brake-to-steer controller will calculate and command braking pressures to increase the yaw rate to an acceptable level.

In a number of illustrative variations, a vehicle may comprise a steering system. In such cases, the steering system may be manually operable by the driver via a steering interface, autonomously operable by an autonomous steering system, or operable as a combination of autonomous and manual steering wherein the steering system is configured to receive and interpret steering input from a driver, the autonomous steering system, or both at the same time. In a number of illustrative variations, a steering interface may comprise a handwheel, a joystick, a trackball, a slider, a throttle, a pushbutton, a toggle switch, a lever, a touchscreen, a mouse, or any other known means of user input.

In a number of illustrative variations, a vehicle may comprise a steering system comprising a steering interface and a steerable propulsion system such as but not limited to a steering wheel and road wheels, respectively. The steering system may be of the steer-by-wire type wherein physical mechanisms do not mechanically communicate a manipulation of the steering interface to the steerable propulsion system and wherein a manipulation of the steering interface affects an associated manipulation of the steerable propulsion system via the communication of electronic devices such as but not limited to sensors, transceivers, and electronically excited actuators. According to some variations, a steer-by-wire system may include at least one road wheel actuator and at least one a handwheel actuator in operable communication with one another via a steer-by-wire system or controller. The steer-by-wire system may include a road wheel actuator system in operable communication with a hand wheel actuator system wherein rotation of the steering wheel or handwheel of a vehicle translates to actuation of the road wheel actuator system such that a vehicle wheel may be turned.

The handwheel actuator assembly may include a steering wheel, a handwheel actuator, such as an electronic motor, and a hand wheel angle sensor. The handwheel actuator assembly may be constructed and arranged to communicate handwheel angle and position to the road wheel actuator assembly including at least one steering actuator constructed and arranged to pivot or turn a road wheel.

In a number of illustrative variations, a vehicle may include an electronic braking system constructed and arranged to apply brake torque to any number of road wheels to slow or stop a vehicle based upon driver handwheel input. The electronic braking system may be in operable communication with the steer-by-wire system, hand wheel actuator assembly, and road wheel actuator assembly via at least one controller. The controller, such as a computing device, may implement any number of systems, including algorithms, for monitoring and controlling propulsion, steering, and braking. According to some variations, the electronic braking system may be utilized to apply differential brake torque to a number of wheels to effectuate lateral motion of the vehicle where a portion of a steer-by-wire system has failed, such as an operable disconnect between the handwheel actuator assembly and the roadwheel actuator assembly.

In a number of illustrative variations, an electronic braking system may utilize a brake-to-steer system including a brake-to-steer algorithm that may communicate brake torque requests to individual wheels as a function of driver steering inputs including steering angle, steering angle rate, and steering torque to steer a vehicle. The brake-to-steer algorithm may communicate brake torque requests when the system has detected a road wheel actuator failure or shut down leading to no output capable of a steering rack. Alternatively, the brake-to-steer algorithm may communicate brake torque requests when the system has detected hand wheel actuator failure or shut down.

In a number of illustrative variations, an electronic braking system may be in operable communication with a mechanical brake system that may include components such as, but not limited to, brake calipers, brake rotors, linings, and the like. During certain circumstances, electronic braking systems in combination with mechanical brake systems may be used to increase vehicle safety such as during electronic stability control events. As used herein, "brake torque," "brake force," or "brake torque" and variations on those terms may refer broadly to the power or ability of any braking system to slow a vehicle.

Brake-to-steer functionality including brake-to-steer algorithms may achieve lateral control of a vehicle without longitudinal compensation but may also force a vehicle to slow down too rapidly before appropriate lateral movement can be achieved.

According to some variations, an electronic braking system in combination with a brake-to-steer system may communicate a target deceleration to a longitudinal dynamic control system including a longitudinal dynamic control algorithm. The longitudinal dynamic control algorithm may regulate throttle and brake torque to achieve target deceleration in the vehicle while monitoring measured longitudinal deceleration feedback. The system may monitor measured vehicle speed and communicate commands to an electronic transmission control module and change transmission gear or shift the equivalent of gear ratio as needed in order to maintain desired engine speed or electric motor speed and optimal engine or motor torque in order to overcome rapid deceleration associated with brake-to-steer functionality.

Driver acceleration and deceleration controller inputs, such as via an accelerated pedal, joystick slider, rotatable knob, hand control or brake pedal, joystick slider, rotatable knob, hand control may be accounted for by adjusting target speed or acceleration within the longitudinal dynamic control algorithm. A longitudinal dynamic control feedback control mechanism by providing instantaneous feedforward powertrain torque requests to assist with longitudinal disturbance associated with brake-to-steer functionality.

FIG. 1 is simply illustrative. The functionality of various systems or algorithms may be carried out by one or more controllers situated anywhere in a vehicle. The block diagram presented in FIG. 1 is one depiction of a logical architecture that may reside in any number of controllers.

One or more algorithms may be used and executed by one or more electronic processors to accomplish the methods, actions, and functionality described herein. Each system, controller, and variation described herein may include a non-transitory computer readable medium having instructions thereon executable by an electronic processor to implement functionality, methods, acts, steps, and actions described herein.

FIG. 1 depicts an illustrative variation of block diagram of a system and method that may include a brake-to-steer controller for steer-by-wire 120 constructed and arranged to communicate propulsion torque requests 122 and brake torque requests 124. The brake-to-steer controller 120 may receive yaw rate reference data 114 from a driver intent calculation module 102. The driver intent calculation module 102 may receive vehicle data such as, but not limited to, vehicle speed 106, and steer-by-wire hand wheel angle data 104. In this way, vehicle speed data 106, steer-by-wire hand wheel angle data 104, and powertrain state data 108, may be combined to generate propulsion torque requests 122 and brake torque requests 124 which may be communicated to appropriate components of the vehicle 136.

The brake-to-steer controller for steer-by-wire 120 may calculate the difference between referenced yaw rate and measured yaw rate 138 within a vehicle to generate final propulsion torque requests 122 and final brake torque requests 124.

Figure 2:
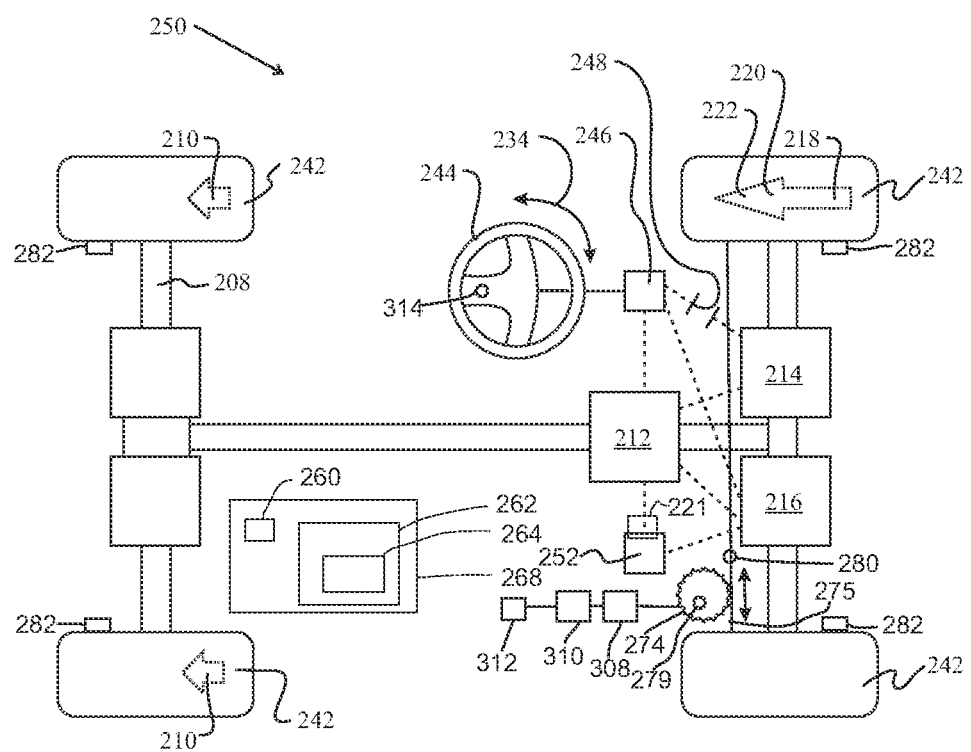
FIG. 2 depicts an illustrative variation of a simplified diagram including a system and method for using brake-to-steer.

FIG. 2 depicts an illustrative variation of various portions of a vehicle equipped with hardware modules or controller sufficient for carrying out at least some of the systems and methods described herein. A vehicle 250 may include a controller 212 constructed and arranged to provide brake-to-steer functionality in a vehicle 250. The controller 212 may be in operable communication with a steer-by-wire system 214 and an electronic braking system 216. The steer-by-wire system 214 and an electronic braking system 216 may be in operable communication with at least one road wheel 242. A driver may utilize a handwheel 244 including at least one handwheel actuator 246 to provide driver input 234 for lateral movement and send steering requests to the steer-by-wire system 214. The electronic braking system 216 may be in operable communication with the controller 212 and a driver braking input system 252, such as a brake pedal system, to receive driver braking input. In some variations, the handwheel actuator 246 may be disconnected or in a failure state 248 from or unable to communicate with the steer-by-wire system 314 or a roadwheel actuator as part of the steer-by-wire system 214. In such a variation, the handwheel actuator 246 may communicate steering requests to the controller 212, which may receive steer-by-wire system 214 health status information. Where the controller 212 has received steer-by-wire system 214 information indicative of steer-by-wire system 214 failure 248 or roadwheel actuator failure, the controller 212 may convert steering requests from the handwheel actuator 246 to brake force or brake torque requests to be communicated to the electronic braking system 216. The electronic braking system 216 may apply brake force or brake torque 220 to determined appropriate roadwheels 242 to effectuate lateral movement of the vehicle as input 234 by the driver via the handwheel 244. A steering wheel angle sensor 314 may be connected to the steering handwheel 244.

A pinion 274 may be equipped with a pinion torque sensor 279 so that any turning of the pinion may be observed by or communicated to the controller 268 and utilized by the methods described herein. In the illustrative variation shown, the rack 275 is equipped with a rack force sensor 280 so that any rack forces detected during driving may be observed by or communicated to the controller 268 and utilized by the methods described herein. Additionally, in the illustrative variation shown, brakes 282 are located near the roadwheels 242. Controller 268 may include a processor 260, memory 262, wherein the instructions 264 stored in the memory 262 are executable by the processor 260 to determine if the hand wheel angle sensor 314 or if the pinion 274, rack 275, pinion sensor 279, rack sensor 280, primary rack or roadwheel actuator 308, secondary backup rack or roadwheel actuator 310, or tertiary backup rack or roadwheel actuator 312 have failed. The tertiary backup rack or roadwheel actuator 312 may be smaller and have lesser force output or torque output than the primary rack or roadwheel actuator 308, secondary backup rack or roadwheel actuator 310. The use of brake-to-steer during operation of the tertiary backup rack or roadwheel actuator 312 allow for the tertiary backup rack or roadwheel actuator 312 to be made smaller and have lesser force output or torque output than a tertiary backup rack or roadwheel actuator would have to have to steer the vehicle without brake-to-steer in operation.

Furthermore, wherein the instructions 264 stored in the memory 262 are executable by the processor 260 to carry out any of the methods or achieve any functionality described herein. Modules, controllers described herein may include software, hardware, or a computing device including non-transitory computer readable medium, such as but not limited to memory, having instructions stored there on, and a processor for executing the instructions to perform the acts, steps, methods, and functionality described herein. Multiple modules and controllers and their associated acts, steps, methods, and functionality may be contained in or achieved by one or more computing devices.

According to some variations, driver input such as acceleration or deceleration inputs, may be accounted for by adjusting desired vehicle speed or target yaw rate.

The following description of variants is only illustrative of components, elements, acts, product, and methods considered to be within the scope of the invention and are not in any way intended to limit such scope by what is specifically disclosed or not expressly set forth. The components, elements, acts, product, and methods as described herein may be combined and rearranged other than as expressly described herein and still are considered to be within the scope of the invention.

Variation 1 may include a non-transitory computer readable medium having instructions thereon executable by an electronic processor to implement functionality comprising enhancing the curvature capability of a tertiary rack and pinion actuator by using brake-to-steer while the tertiary rack and pinion actuator is operating.

Variation 2 may include a non-transitory computer readable medium as set forth in Variation 1 wherein the instructions implement functionality of determining that both of a primary rack and pinion actuator and a secondary rack and pinion actuator have failed before implementing the act of enhancing the curvature capability of a tertiary rack and pinion actuator by using brake-to-steer while the tertiary rack and pinion actuator is operating.

Variation 3 may include a method comprising enhancing the curvature capability of a tertiary steer-by-wire rack actuator comprising using brake-to-steer while the tertiary rack and pinion actuator is operating the steer-by-wire rack.

Variation 4 may include a method as set forth in Variation 3 further comprising determining that a primary rack and pinion actuator and a secondary rack and pinion actuator have failed before implementing the act of enhancing the curvature capability of a tertiary rack and pinion actuator by using brake-to-steer while the tertiary rack and pinion actuator is operating.

Variation 5 may include a method as set forth in Variation 3 wherein the tertiary rack and pinion actuator has a maximum output force or torque force that is less than a tertiary rack and pinion actuator would have to have in order steer a vehicle with brake-to-steer operating.

Variation 6 may include a method as set forth in Variation 4 wherein the tertiary rack and pinion actuator has a maximum output force or torque face that is less than either of the primary rack and pinion actuator or the secondary rack and pinion actuator.

Variation 7 may include a method as set forth in Variation 3 wherein the tertiary rack and pinion actuator has a maximum output force or torque force that is less than one half of the primary rack and pinion actuator or the secondary rack and pinion actuator.

Variation 8 may include a method as set forth in Variation 3 wherein the tertiary rack and pinion actuator has a maximum output force or torque force that is less than one third of the primary rack and pinion actuator or the secondary rack and pinion actuator.

Variation 9 may include a method as set forth in Variation 3 wherein the tertiary rack and pinion actuator has a maximum output force or torque force that is less than one quarter of the primary rack and pinion actuator or the secondary rack and pinion actuator.

Variation 10 may include system for use in a vehicle having differential electronic brakes at each roadwheel, a propulsion system, a steer by wire system, of a primary rack and pinion actuator, a secondary rack and pinion actuator and a tertiary rack and pinion actuator, one or more modules or controllers including an electronic processor, a non-transitory computer readable medium having instructions thereon executable by the electronic processor to implement functionality comprising determining that both of a primary rack and pinion actuator and a secondary rack and pinion actuator have failed and thereafter sending commands to the a tertiary rack and pinion actuator, the differential electronic brakes at each roadwheel, and the propulsion system, to provide steer by brake assistance to the tertiary rack and pinion actuator to increase the curvature capability of steering the vehicle than the curvature capability of only using the tertiary rack and pinion actuator without brake-to-steer functionality.

Variation 11 may include a system as set forth in Variation 7 wherein the tertiary rack and pinion actuator has a maximum output force or torque force that is less than a tertiary rack and pinion actuator would have to have in order steer a vehicle with brake-to-steer operating.

Variation 12 may include a system as set forth in Variation 7 wherein the tertiary rack and pinion actuator has a maximum output force or torque force that is less than either of the primary rack and pinion actuator or the secondary rack and pinion actuator.

Variation 13 may include a system as set forth in Variation 7 wherein the tertiary rack and pinion actuator has a maximum output force or torque force that is less than one half of the primary rack and pinion actuator or the secondary rack and pinion actuator.

Variation 14 may include a system as set forth in Variation 7 wherein the tertiary rack and pinion actuator has a maximum output force or torque force that is less than one third of the primary rack and pinion actuator or the secondary rack and pinion actuator.

Variation 15 may include a system as set forth in Variation 7 wherein the tertiary rack and pinion actuator has a maximum output force or torque force that is less than one quarter of the primary rack and pinion actuator or the secondary rack and pinion actuator.

The above description of select variations within the scope of the invention is merely illustrative in nature and, thus, variations or variants thereof are not to be regarded as a departure from the spirit and scope of the invention.

What is claimed is:

1. A non-transitory computer readable medium having instructions thereon executable by an electronic processor to implement functionality comprising enhancing the curvature capability of a tertiary steering actuator by using brake-to-steer while the tertiary steering actuator is operating.

2. The non-transitory computer readable medium as set forth in claim 1 wherein the instructions implement functionality of determining that both of a primary steering actuator and a secondary steering actuator have failed before implementing the act of enhancing the curvature capability of a tertiary steering actuator by using brake-to-steer while the tertiary steering actuator is operating.

3. A method comprising enhancing the curvature capability of a tertiary steering actuator comprising using brake-to-steer while the tertiary steering actuator is operating.

4. The method as set forth in claim 3 further comprising determining that a primary steering actuator and a secondary steering actuator have failed before implementing the act of enhancing the curvature capability of a tertiary steering actuator by using brake-to-steer while the tertiary steering actuator is operating.

5. The method as set forth in claim 3 wherein the tertiary steering actuator has a maximum output force or torque force that is less than a tertiary steering actuator would have to have in order steer a vehicle with brake-to-steer operating.

6. The method as set forth in claim 4 wherein the tertiary steering actuator has a maximum output force or torque force that is less than either of the primary steering actuator or the secondary steering actuator.

7. The method as set forth in claim 3 wherein the tertiary steering actuator has a maximum output force or torque force that is less than one half of the primary steering actuator or the secondary steering actuator.

8. The method as set forth in claim 3 wherein the tertiary steering actuator has a maximum output force or torque force that is less than one third of the primary steering actuator or the secondary steering actuator.

9. The method as set forth in claim 3 wherein the tertiary steering actuator has a maximum output force or torque force that is less than one quarter of the primary steering actuator or the secondary steering actuator.

10. A system for use in a vehicle having differential electronic brakes at each roadwheel, a propulsion system, a steer by wire system, of a primary steering actuator, a secondary steering actuator and a tertiary steering actuator, one or more modules or controllers including an electronic processor, a non-transitory computer readable medium having instructions thereon executable by the electronic processor to implement functionality comprising determining that both of a primary steering actuator and a secondary steering actuator have failed and thereafter sending commands to the a tertiary steering actuator, the differential electronic brakes at each roadwheel, and the propulsion system, to provide steer by brake assistance to the tertiary steering actuator to increase the curvature capability of steering the vehicle than the curvature capability of only using the tertiary steering actuator without brake-to-steer functionality.

11. The system as set forth in claim 10 wherein the tertiary steering actuator has a maximum output force or torque force that is less than a tertiary steering actuator would have to have in order steer a vehicle with brake-to-steer operating.

12. The system as set forth in claim 10 wherein the tertiary steering actuator has a maximum output force or torque force that is less than either of the primary steering actuator or the secondary rack and pinion actuator.

13. The system as set forth in claim 10 wherein the tertiary steering actuator has a maximum output force or torque force that is less than one half of the primary steering actuator or the secondary steering actuator.

14. The system as set forth in claim 10 wherein the tertiary steering actuator has a maximum output force or torque force that is less than one third of the primary steering actuator or the secondary rack and pinion actuator.

15. The system as set forth in claim 10 wherein the tertiary steering actuator has a maximum output force or torque force that is less than one quarter of the primary steering actuator or the secondary steering actuator.

16. The non-transitory computer readable medium as set forth in claim 1 wherein the using brake-to-steer is conducted to provide steer by brake assistance to the tertiary steering actuator to increase the curvature capability of steering the vehicle than the curvature capability of only using the tertiary steering actuator without brake-to-steer functionality.

17. The non-transitory computer readable medium as set forth in claim 1 wherein the tertiary steering actuator is a tertiary rack and pinion actuator.

18. The method as set forth in claim 3 wherein the tertiary steering actuator is a tertiary rack and pinion actuator.

19. The system as set forth in claim 3 wherein the tertiary steering actuator is a tertiary rack and pinion actuator.

20. The system as set forth in claim 19 wherein the primary steering actuator is a primary rack and pinion actuator, and the secondary steering actuator is a secondary rack and pinion actuator.

* * * * *